(12) United States Patent
Flander et al.

(10) Patent No.: US 9,751,560 B2
(45) Date of Patent: Sep. 5, 2017

(54) AXLE ASSEMBLY

(71) Applicants: Kevin Flander, New Sharon, IA (US); Jim Dean, Spencer, IA (US); Michael H. Dick, Clear Lake, IA (US)

(72) Inventors: Kevin Flander, New Sharon, IA (US); Jim Dean, Spencer, IA (US); Michael H. Dick, Clear Lake, IA (US)

(*) Notice: Subject to any disclaimer, the term of this patent is extended or adjusted under 35 U.S.C. 154(b) by 448 days.

(21) Appl. No.: 14/570,786

(22) Filed: Dec. 15, 2014

(65) Prior Publication Data

US 2015/0166102 A1    Jun. 18, 2015

Related U.S. Application Data

(60) Provisional application No. 61/915,600, filed on Dec. 13, 2013.

(51) Int. Cl.
| | | |
|---|---|---|
| *B62D 7/14* | (2006.01) | |
| *B62D 7/06* | (2006.01) | |
| *B62D 13/04* | (2006.01) | |
| *B62D 13/00* | (2006.01) | |
| *B60G 3/14* | (2006.01) | |

(52) U.S. Cl.
CPC ............. *B62D 13/04* (2013.01); *B60G 3/14* (2013.01); *B62D 13/005* (2013.01); *B60G 2200/132* (2013.01); *B60G 2200/44* (2013.01)

(58) Field of Classification Search
CPC ........ B62D 13/04; B62D 13/005; B60G 3/14; B60G 2200/44; B60G 2200/132
See application file for complete search history.

(56) References Cited

U.S. PATENT DOCUMENTS

| | | | | |
|---|---|---|---|---|
| 3,436,069 A | * | 4/1969 | Henschen | B60G 11/225 267/154 |
| 3,981,513 A | * | 9/1976 | Erskine | B62D 7/06 280/93.512 |
| 4,600,216 A | * | 7/1986 | Burkholder | B60G 17/033 180/210 |
| 4,655,467 A | * | 4/1987 | Kitzmiller | B60G 11/225 280/124.128 |
| 5,340,142 A | * | 8/1994 | Kuhns | B62D 13/04 280/444 |
| 8,833,504 B2 | * | 9/2014 | Williams | B60T 8/1755 180/408 |
| 2012/0123646 A1 | * | 5/2012 | Mantini | B60G 17/019 701/48 |

* cited by examiner

*Primary Examiner* — Joseph M Rocca
*Assistant Examiner* — Joselynn Y Sliteris
(74) *Attorney, Agent, or Firm* — Zarley Law Firm, P.L.C.

(57) ABSTRACT

The axle assembly has an elongated shaft that is connected to a mounting bracket. A first end of an arm is connected to the elongated shaft. The arm extends rearwardly from the elongated shaft and connects to a bearing bracket at a second end. The bearing bracket has a pair of flanges and a pin that passes through the flanges and is received within an opening of a rotatable arm. The rotatable arm is connected to an axle.

14 Claims, 3 Drawing Sheets

AXLE ASSEMBLY

CROSS REFERENCE TO RELATED APPLICATIONS

This application claims the benefit of U.S. Provisional Application No. 61/915,600, filed Dec. 13, 2013.

BACKGROUND OF THE INVENTION

This invention is directed to an axle assembly and more specifically a rear torsion axle assembly that mirrors the turn of the front wheels.

Axle assemblies are known in the art. Currently, to assist in turning, long trailers do not have axles where the wheels turn in relation to the front wheels. Therefore, a need exists in the art for an axle assembly that addresses these deficiencies.

An objective of the present invention is to provide an axle assembly with rear torsion.

A further objective of the present invention is to provide an axle assembly that is easy to actuate.

A still further objective of the present invention is to provide an axle assembly where the turn of the rear wheels mirrors the turn of the front wheels automatically.

These and other objectives will be apparent to one of ordinary skill in the art based upon the following written description.

SUMMARY OF THE INVENTION

The axle assembly has an elongated shaft that is connected to a mounting bracket. A first end of an arm is connected to the elongated shaft. The arm extends rearwardly from the elongated shaft and connects to a bearing bracket at a second end. The bearing bracket has a pair of flanges and a pin that passes through the flanges and is received within an opening of a rotatable arm. The rotatable arm is connected to an axle.

DETAILED DESCRIPTION OF THE PREFERRED EMBODIMENT

Figure 1:
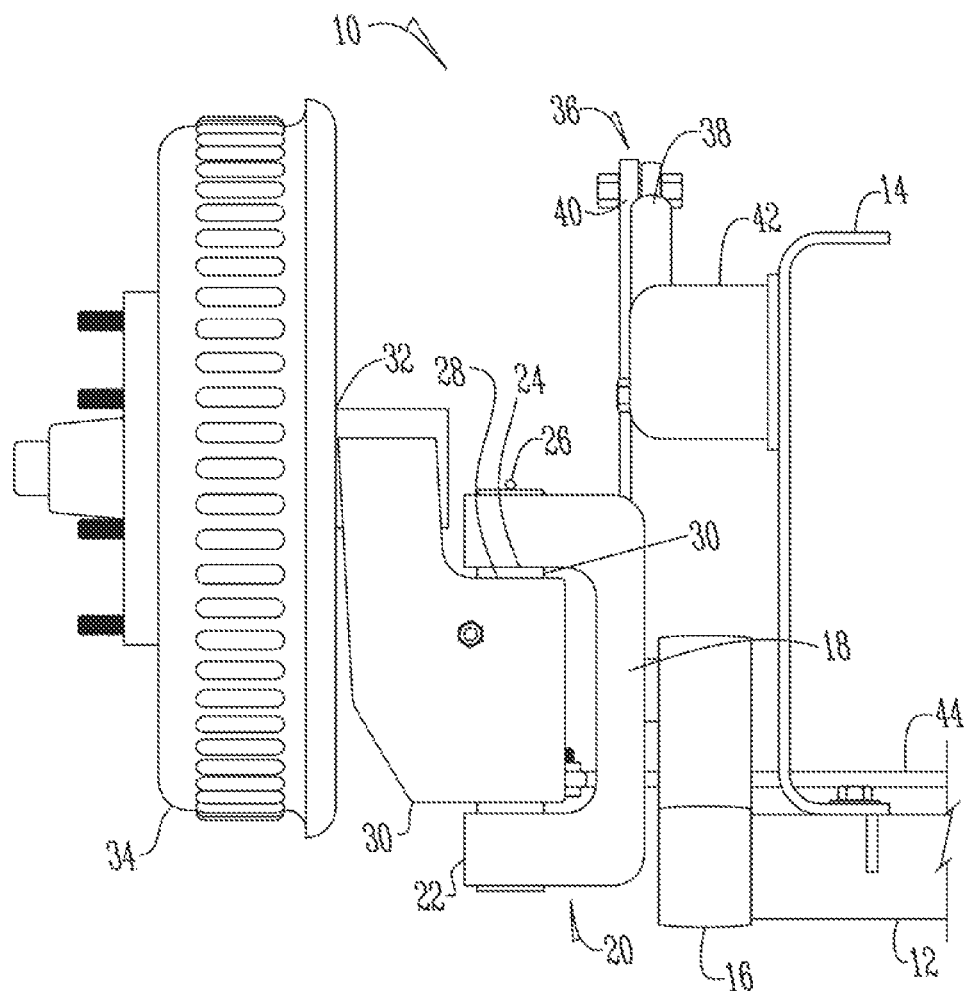
FIG. 1 is a perspective view of the back of an axle assembly.
Figure 2:
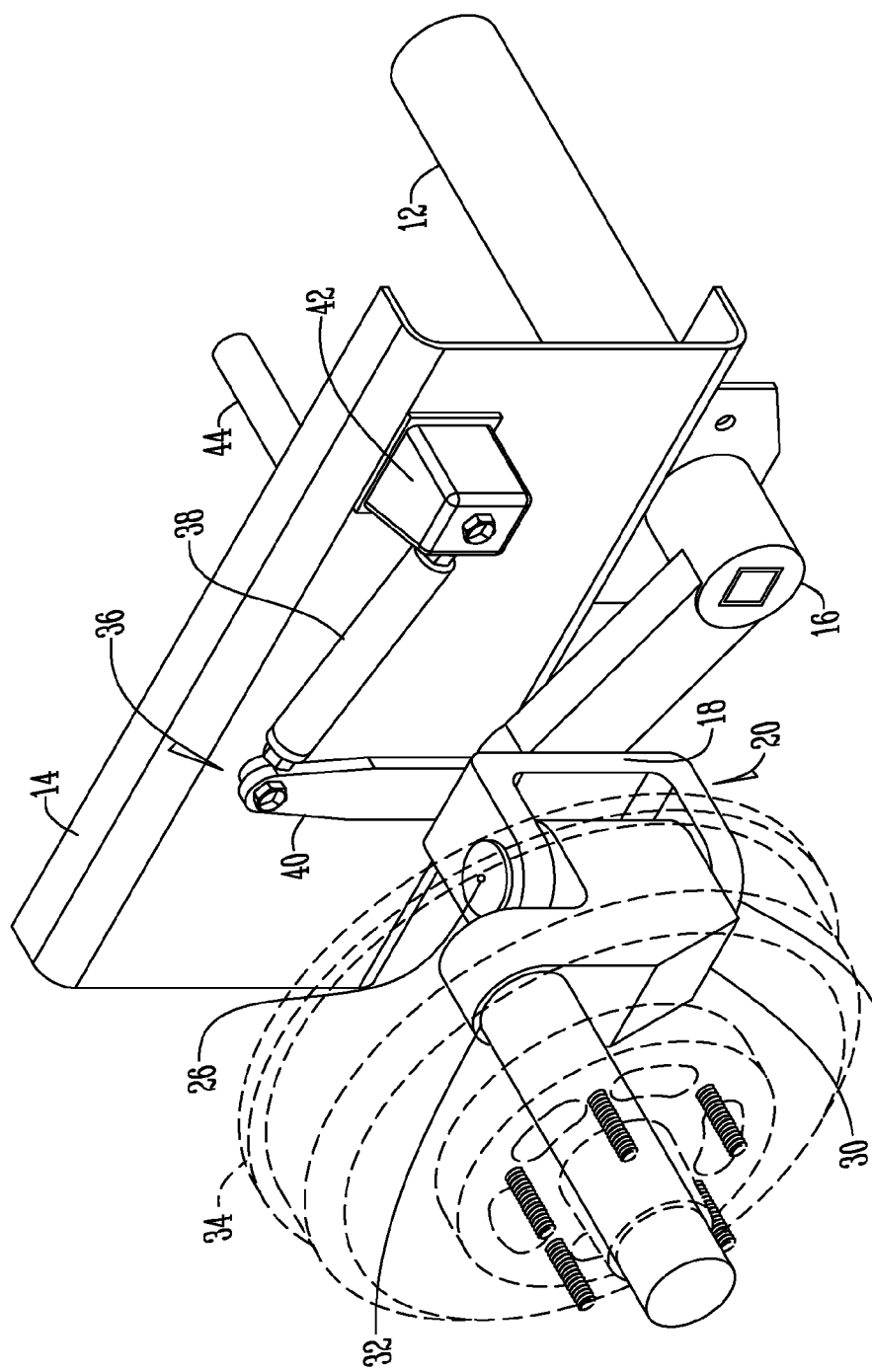
FIG. 2 is a perspective view of the side of an axle assembly.
Figure 3:
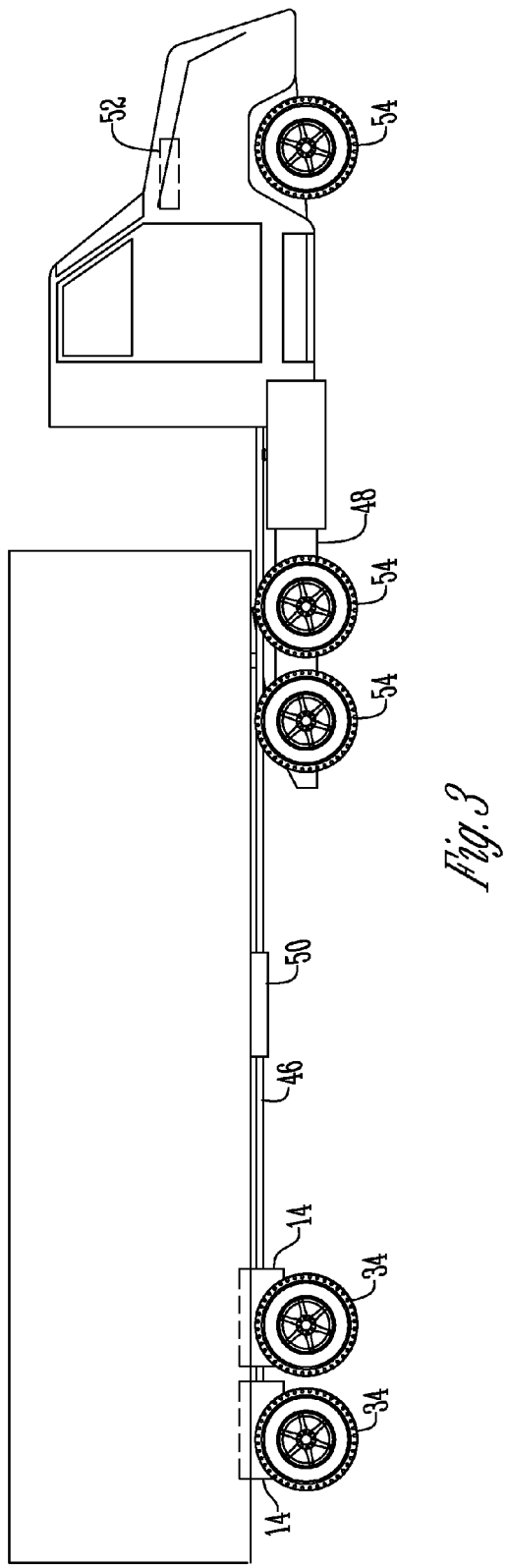
FIG. 3 is a side view of an axle assembly.

Referring to the Figures, the axle assembly 10 includes a longitudinally extending shaft 12. Connected to the top of and transverse to the shaft 12 are a pair of mounting brackets 14 that are in generally spaced parallel relation to one another.

Connected to each end of the shaft 12 is an arm 16 that extends rearwardly and upwardly in relation to the shaft 12. Connected to the opposite end of the arm 16 is a bearing bracket 18. Preferably the bearing bracket 18 has a connecting section 20 that terminates into outwardly extending flanges 22 that are aligned in vertical relation to form a generally C-shaped bracket 18.

Disposed within each flange 22 is a bearing 24. A pin 26 extends between the bearings 24 and is received by an opening 28 in a rotatable arm 30 to rotatably connect arm 30 to bracket 18. Preferably, arm 30 is generally L-shaped and is connected to an axle 32 at an end opposite opening 28. The axle 32 extends outwardly to which a wheel 34 is rotatably attached about bearings (not shown).

To provide further support a link assembly 36 connects bracket 18 to mounting bracket 14. Preferably, link assembly 36 has a link 38 such as a turnbuckle or the like that is connected to and extends between a support arm 40 and support bracket 42. Support arm 40 is connected to bearing bracket 18 and support bracket 42 is connected to mounting bracket 14.

Link assembly 36 is designed to connect to and hold bracket 18 and pin 26 to and with support bracket 42 and mounting bracket 14 at all times, and serves to prevent separation of these components. The link assembly 36 is adjustable so that it can maintain the position of the bracket 18 and pin 26 in the appropriate position should anything change with respect to these components, that is, should wear cause the position of these components to change or shift with respect to one another.

Connected to and extending between the rotatable arms 30 is an actuating bar 44. Preferably, the actuating bar 44 is generally parallel to shaft 12 and dwells in a plane below mounting brackets 14. An actuating member 46 is connected to a vehicle frame 48 at one end and the actuating bar 44 at the opposite end. A sensor 50 is connected to the actuating member 46 to detect the displacement of the actuating member 46. Connected to both the actuating member 46 and sensor 50 is a controller 52.

In operation, the controller 52 receives a signal from a sensing device or sensor 50 that determines the angle of the front wheels 54 of a vehicle when making a turn. Based upon this signal the controller 52 determines an angle for the rear wheel 34 that mirrors or complements the front wheels. Based upon the determined angle, the controller 52 calculates the amount of displacement needed so that the actuating member 46 moves to achieve the desired angle for the wheels 34. More specifically, when the controller 52 activates actuating member 46, actuating member 46 causes actuating bar 44 to move toward one wheel 34 and away from the other. Because the actuating bar 44 is connected to the rotatable arms 30, the bar 44 causes the arms 30 to rotate in relation to the bearing bracket 18 which in turn causes the wheels 34 to rotate. Sensor 50 monitors the displacement of actuating member 46 and provides information to the controller so that the controller can determine the position of the wheels 34, 54. The controller also determines the speed of the vehicle and locks the actuating member in a straight position (i.e., straight wheels) when the vehicle reaches a predetermined speed such as 5 m.p.h.

What is claim is:

1. An axle assembly comprising:
   an elongated shaft;
   a mounting bracket connected to the elongated shaft;
   an arm having a first end connected to an end of the elongated shaft and extending rearwardly;
   a bearing bracket having a pair of flanges connected to a second end of the arm;
   a link assembly connected to the bearing bracket and mounting bracket;
   a pin disposed between the pair of flanges and received in an opening of a rotatable arm; and
   an axle connected to the rotatable arm.

2. The axle assembly of claim 1 further comprising a bearing disposed within the pair of flanges.

3. The axle assembly of claim 1 wherein the rotatable arm is generally L-shaped.

4. The axle assembly of claim 1 further comprising the link assembly having a link connected to a support arm and a support bracket.

5. The axle assembly of claim 4 wherein the support arm is connected to the bearing bracket.

6. The axle assembly of claim 4 wherein the support bracket is connected to the mounting bracket.

7. The axle assembly of claim 1 wherein the link assembly is adjustable.

8. The axle assembly of claim 1 further comprising an actuating bar connected to the rotatable arm.

9. The axle assembly of claim 8 wherein the actuating bar is generally parallel to the shaft and below the mounting bracket.

10. The axle assembly of claim 9 further comprising an actuating member connected at one end to the actuating bar and a vehicle frame at a second end.

11. The axle assembly of claim 10 further comprising a sensor connected to the actuating member that is in communication with a controller.

12. The axle assembly of claim 11 wherein the controller determines an angle of a front wheel based on a signal from the sensor.

13. The axle assembly of claim 12 wherein the controller actuates the actuating member to turn the axle such that an angle of the axle complements the angle of the front wheel.

14. The axle assembly of claim 11 wherein the controller monitors speed to lock the axle in a straight position when at a predetermined speed.

* * * * *